United States Patent [19]

Takata et al.

[11] Patent Number: 4,929,098

[45] Date of Patent: May 29, 1990

[54] SELF-ALIGNING ROLLER BEARING

[75] Inventors: Hirotoshi Takata, Yokohama; Eihiro Suruga; Gentei Inoue, both of Fujisawa, all of Japan

[73] Assignee: Nippon Seiko Kabushiki Kaisha, Tokyo, Japan

[21] Appl. No.: 298,916

[22] Filed: Jan. 19, 1989

[30] Foreign Application Priority Data

Mar. 4, 1988 [JP] Japan ................................ 63-49781

[51] Int. Cl.$^5$ ............................................. F16C 33/36
[52] U.S. Cl. ...................................... 384/450; 384/568
[58] Field of Search ............... 384/450, 548, 558, 565, 384/568

[56] References Cited

U.S. PATENT DOCUMENTS

| | | | |
|---|---|---|---|
| 3,713,712 | 1/1973 | Derner et al. | 384/565 |
| 3,910,656 | 10/1975 | Price et al. | 384/558 |
| 4,456,313 | 6/1984 | Hartnett et al. | 384/565 |
| 4,557,613 | 12/1985 | Tallian et al. | 384/568 |
| 4,783,181 | 11/1988 | Takata | 384/450 |
| 4,802,775 | 2/1989 | Takata | 384/450 |
| 4,828,404 | 5/1989 | Takata | 384/450 |

FOREIGN PATENT DOCUMENTS

| | | | |
|---|---|---|---|
| 175818 | 9/1985 | Japan | 384/548 |
| 110018 | 5/1987 | Japan | 384/565 |
| 52317 | 7/1922 | Sweden | 384/568 |

Primary Examiner—Thomas R. Hannon
Attorney, Agent, or Firm—Shapiro and Shapiro

[57] ABSTRACT

A self-aligning roller bearing having a plurality of spherical rollers disposed between the track surface of an inner race and the track surface of an outer race. Each roller has a rolling surface generator having central portion corresponding to at least 80% of the rolling surface axial length and of a single radius of curvature smaller than those of the inner and outer track surfaces. The rolling surface generator also has opposite end portions each with one or more radii of curvature smaller than that of the central portion.

3 Claims, 2 Drawing Sheets

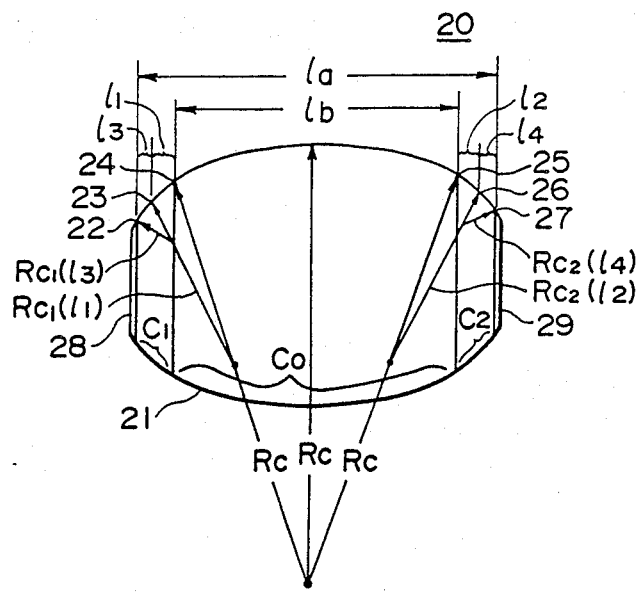
F I G. 2
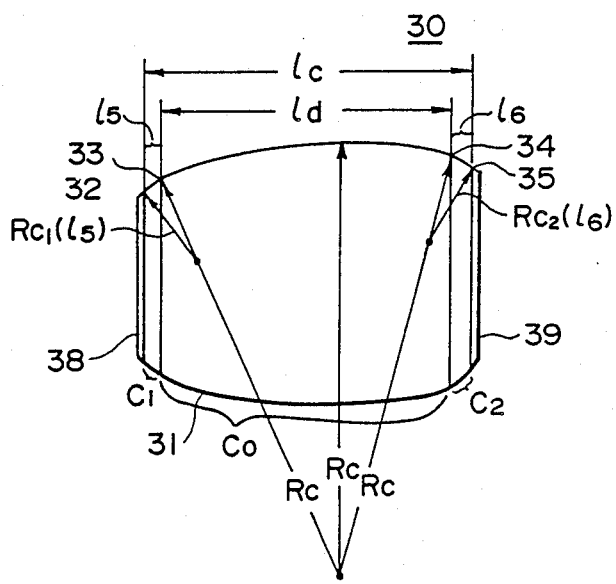
F I G. 3

SELF-ALIGNING ROLLER BEARING

BACKGROUND OF THE INVENTION

1. Field of the Invention

This invention relates to a self-aligning roller bearing in which the occurrence of edge stress in the surfaces of contact between rollers and races is eliminated or decreased.

2. Related Background Art

In the prior-art self-aligning roller bearing, the state of contact between an inner race or an outer race and a roller is the contact between single arcs when viewed in a plane containing the generator of the roller, and this leads to the following disadvantages:

(1) When the rate of contact between the arc of the generator of the roller and the arc of the generator of the race is increased, the edge stress in the portion of contact sharply increases as the load increases, and there arise problems such as a short life, abrasion, plastic deformation and seizure.

(2) If said rate of contact is decreased to avoid the occurrence of such edge stress, the load range in which a state of point contact is provided increases, and there arise problems such as a short life, reduced rigidity, abrasion and plastic deformation.

To overcome these disadvantages, Japanese Patent Application Laid-Open No. 60-175818 discloses a self-aligning roller bearing in which the generator of the track surface is constituted by a curve having a plurality of radii of curvature, and in this bearing, the rate of contact between the races and the rollers is decreased from the center of contact toward the edge portion to thereby achieve the prevention or reduction of the edge stress.

However, the self-aligning roller bearing disclosed in the aforementioned Japanese Patent Application Laid-Open No. 60-175818 suffers from the following problems:

(1) The position of contact between the outer race and the roller is not fixed due to the self-aligning action of this, but is variable in the axial direction. Therefore, even if a curve having a plurality of radii of curvature is given to the track surface of the outer race, the optimum performance of the bearing cannot be effectively obtained.

(2) Since at least the generator of the track surface of the inner race is a curve having a plurality of radii of curvature, the bearing displays its optimum performance only in the design operating condition of the inner race. Consequently, in order that the bearing may be used in different operating conditions, bearings having inner races differing in the shape of the generator must be severally prepared.

Where a plurality of operating conditions are contemplated, it is more advantageous in manufacture to adjust the curvature of the rollers to several kinds of groups and to combine them with the inner and outer race track surfaces in accordance with the operating conditions rather than to manufacture inner and outer races having their curvatures adjusted intricately in accordance with the operating conditions.

OBJECT AND SUMMARY OF THE INVENTION

The present invention provides a self-aligning roller bearing in which the edge stress is prevented or decreased and which can display the optimum performance under a wide range of operating conditions.

The self-aligning roller bearing according to the present invention is a self-aligning roller bearing having a plurality of spherical rollers disposed between the track surface of an inner race and the track surface of an outer race, wherein the radius of curvature of the generator on the track surface of the outer race is $R_A$, the radius of curvature of the generator on the track surface of the inner race is $R_B$, and the generator on the rolling surface of the rollers is constituted by a curve having a plurality of radii of curvature, the central portion having 80% or more of the full axial length of the rolling surface of the rollers and being defined by a generator of radius of curvature $R_C$, the opposite end portions except said central portion of the rolling surface of the rollers being each defined by a single generator and/or a plurality of groups of generators of radii of curvature $R_{C1}(l)$ and $R_{C2}(l)$ and/or a generator of continuously varying curvature, and wherein the relation $$R_{C1}(l), R_{C2}(l) < R_C < R_A, R_B$$

is established between the radii of curvature of these generators.

The track surface of the inner race or the outer race and the rolling surface of the rollers are constructed so that $R_C < R_A$, $R_B$ whereby when the load is relatively light, the central portion of the rolling surface, i.e., most (80% or more) of the full length thereof, is involved in contact and the stress (surface pressure) produced between the surfaces of contact is reduced to thereby prevent abnormal abrasion, plastic deformation, seizure, etc. of the portions of contact and achieve a long life. When the load is relatively heavy, the opposite end portions (a total of 20% or less) of the full length of the rolling surface is also involved in contact, and, since these portions are constructed with the radius of curvature of the generator being smaller than the radius of curvature of the generator of the central portion of the roller, the increase in edge stress resulting from the heavy load is efficiently prevented or mitigated.

BRIEF DESCRIPTION OF THE DRAWINGS

FIG. 2 is a front view of a symmetrical roller 20 used in the self-aligning roller bearing.

FIG. 3 is a front view of an asymmetrical roller 30 used in the self-aligning roller bearing.

DESCRIPTION OF THE PREFERRED EMBODIMENTS

Figure 1:
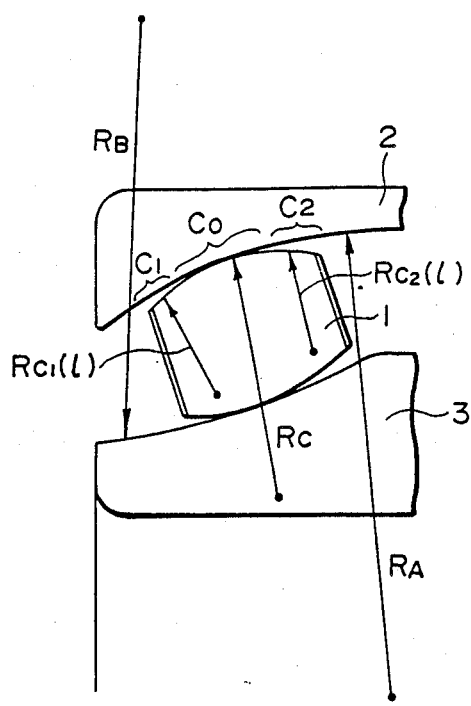
FIG. 1 is an axial cross-sectional view of a self-aligning roller according to the present invention, showing only a portion thereof.

An embodiment of a self-aligning roller bearing according to the present invention will hereinafter be described with reference to the drawings.

FIG. 1 is an axial cross-sectional view of a self-aligning roller bearing according to the present invention showing only a portion thereof. In FIG. 1, there is shown only one roller 1 held between an outer race 2 and an inner race 3. In axial section, the rolling surface of roller 1 is made into a curve of which the generator radius of curvature is $R_C$ in a range $C_0$, the radius of curvature is $R_{C1}(l)$ in a range $C_1$, and the generator radius of curvature is $R_{C2}(l)$ in a range $C_2$. The radii $R_{C1}(l)$ and $R_{C2}(l)$ may each be a group of radii of curvature continuously varying within the range of length l, a group of radii of curvature intermittently varying within the range of length l, or a single radius arc. The size of the range of $C_0$ relative to $(C_1+C_0+C_2)$ is 80% or more, and moreover, the rolling surface is arranged such that the ranges of $C_1$ and $C_2$ exist. Thus, there is established the following relation between the radii of curvature:

$$R_{C1}(l), R_{C2}(l) < R_C < R_A, R_B$$

An embodiment of the roller according to the present invention will now be described in detail with reference to FIG. 2. FIG. 2 is a front view of a generally symmetrical roller 20 (which refers to a roller whose greatest diameter portion is at the center of the effective length of the roller) used in a self-aligning roller bearing, and the peripheral surface 21 thereof is generally symmentrical with respect to the center line in a direction perpendicular to the axis of the roller. Exemplary points are given on the peripheral surface 21 to make the roller readily understood. From left to right, points 22, 23, 24, 25, 26 and 27 are given along the upper outline of the peripheral surface 21. The range $C_1$ is prescribed between the points 22 and 24 of the symmetrical roller 20, the range $C_0$ comprising an arc having a single arc radius $R_C$ is prescribed between the points 24 and 25 of the symmetrical roller 20, and the range $C_2$ is prescribed between the points 25 and 27 of the symmetrical roller 20. The point 22 is the boundary portion between a left chamfered portion 28 and the peripheral surface 21, and the point 27 is the boundary portion between a right chamfered portion 29 and the peripheral surface 21.

In the present embodiment, the ranges $C_1$ and $C_2$ each comprise an arc having two generator radii of curvature. More particularly, in the range $C_1$, the points 22 and 23 are connected together by an arc having a radius of curvature $R_{C1}(l_3)$ to provide a range $l_3$, and the points 23 and 24 are connected together by an arc having a radius of curvature $R_{C1}(l_1)$ to provide a range $l_1$. Further, in the range $C_2$, the points 25 and 26 are connected together by an arc having a radius of curvature $R_{C2}(l_2)$ to provide a range $l_2$, and the points 26 and 27 are connected together by an arc having a radius of curvature $R_{C2}(l_4)$ to provide a range $l_4$. The arcs are smoothly connected together at the points of connection.

In the symmetrical roller 20, when the full lenght of the peripheral surface 21 in the axial direction is represented by la, the axial lenght lb of the range $C_0$ which is the central portion of the peripheral surface 21 has the relation that $$lb \geq 0.8\ la.$$

Further, the respective generator radii of curvature have the relations that $$R_{C1}(l_3) < R_{C1}(l_1) < R_C < R_A, R_B$$

and $$R_{C2}(l_4) < R_{C2}(l_2) < R_C < R_A, R_B$$

Thus, the generator radius of curvature of the peripheral surface of the roller gradually decreases from the center thereof toward the outer portion thereof.

A second embodiment of the roller according to the present invention will now be described in detail with reference to FIG. 3. FIG. 3 is a front view of an asymmetrical roller (which refers to a roller whose greatest diameter portion deviates toward one side from the center of the effective lenght of the roller) 30 used in a self-aligning roller bearing. The peripheral surface of the roller comprises three arcs. Exemplary points are given on the peripheral surface 31 to make the roller readily understood. From left to right, points 32, 33, 34 and 35 are given along the upper outline of the peripheral surface 31. The range $C_1$ is prescribed between the points 32 and 33 of the asymmetrical roller 30, the range $C_0$ is prescribed between the points 33 and 34 of the asymmetrical roller 30, and the range $C_2$ is prescribed between the points 34 and 35 of the asymmetrical roller 30. The point 32 is the boundary portion between the left chamfered portion 38 and the peripheral surface 31, and the point 35 is the boundary portion between the right chamfered portion 39 and the peripheral surface 31.

In the second embodiment, in the range $C_1$, the points 32 and 33 are connected together by an arc having a radius of curvature $R_{C1}(l_5)$ to provide a range $l_5$, and in the range $C_2$, the points 34 and 35 are connected together by an arc having a radius of curvature $R_{C2}(l_6)$ to provide a range $l_6$. The arcs are smoothly connected with the central portion arc in the range $C_0$ at the points of connection. The difference of the second embodiment from the first embodiment is that the roller of the second embodiment is an asymmetrical roller and therefore the generator radius of curvature $R_{C1}(l_5)$ and the generator radius of curvature $R_{C2}(l_6)$ may differ from each other. Further, the second embodiment differs from the first embodiment in that the ranges $C_1$ and $C_2$ each comprise a single arc, but as in the first embodiment, the generator radius of curvature may be gradually decreased toward the outer portion of the peripheral surface and the ranges $C_1$ and $C_2$ each may comprise a plurality of arcs.

In the asymmetrical roller 30, when the full length of the rolling surface 31 in the axial direction is represented by lc, the axial length ld of the range $C_0$, which is the central portion of the rolling surface 31 has the relation that $$ld \geq 0.8 lc.$$

Further, the respective generator radii of curvature have the relation that $$R_{C1}(l_5), R_{C2}(l_6) < R_C < R_A, R_B$$

Thus, the generator radius of curvature of the peripheral surface of the roller gradually decreases from the center of the roller toward the outer portion thereof.

Although the self-aligning roller bearing according to the present invention has been described above with reference to the illustrative embodiments of the drawings, it will be appreciated that the present invention is not restricted to the above-described embodiments, and that changes and improvements thereof are of course possible within the scope of the invention. For example, the number of the arcs at the opposite ends of the roller is not limited to one or two, but may be any number as long as they gradually smoothly decrease toward the outer portion.

In the self-aligning roller bearing according to the present invention, there are obtained the following effects.

The track surface of the inner race or the outer race and the rolling surface of the roller are constructed so that $R_C < R_A, R_B$, so that when the load is relatively light, the central portion of the rolling surface, i.e., most (80% or more) of the full lenght, is involved in contact and the stress (surface pressure) created between the contact surfaces is reduced and abnormal abrasion, plastic deformation, seizure, etc. of the contact portion are prevented to prolong the life of the bearing. Also, when the load is relatively heavy, the opposite end portions (a total of 20% or less of the full length) of the rolling surface are involved in contact, and because these portions are designed such that the radius of curvature of the generator of the roller is smaller than the radius of curvature of the generator of the central portion, an increase in the end stress resulting from the heavy load is efficiently prevented or mitigated.

Thus, the present invention provides a self-aligning roller bearing in which the contact between the races and the roller distributes the load over a wide range from a light load to a heavy load and with a relatively uniform contact stress over the full length of the roller. As a result, the bearing of the invention displays a predetermined performance over a wide-range operating conditions without such problems as short life, reduced rigidity, abrasion, etc. due to the state of excessive point contact and without such problems as short life, abrasion, plastic deformation, seizure, etc. due to a sharp increase in the contact end stress resulting from a heavy load.

Also, only the generator of the roller is constituted by two or more generators, and generators of ordinary design having a single radius of curvature can be used as the generators of the track surfaces of the inner and outer races. Therefore, by suitably preparing several kinds of rollers to meet operating conditions and by appropriate selection of the rollers, an optimum bearing conforming to the conditions of use can be obtained very easily and at a low cost.

Further still, not only between the roller and the inner race, but also between the roller and the outer race, effective contact (uniformization of stress) becomes possible, including the time of automatic self-aligning during use.

What is claimed is:

1. A self-aligning roller bearing having a plurality of spherical rollers disposed between the track surface of an inner race and the track surface of an outer race, characterized in that the generator of the track surface of the outer race has a single radius of curvature $R_A$, the generator of the track surface of the inner race has a single radius of curvature $R_B$, and the generator of the rolling surface of each roller is constituted by a curve having a plurality of radii of curvature, with a central portion of the rolling surface generator corresponding to at least 80% of the full axial length of the rolling surface and having a single radius of curvature $R_C$, and with opposite end portions of the rolling surface generator having respective radii of curvature $R_{C1}(l)$ and $R_{C2}(l)$, where $$R_{C1}(l), R_{C2}(l) < R_C < R_A, R_B$$

and where each of $R_{C1}(l)$ and $R_{C2}(l)$ represents either a single radius of curvature or a greater number of radii of curvature progressively decreasing toward the corresponding end of said rolling surface generator.

2. A self-aligning roller bearing according to claim 1, wherein adjacent portions of said rolling surface generator with different radii of curvature are smoothly connected.

3. A self-aligning roller bearing according to claim 1, wherein at least one of said end portions of said rolling surface generator includes a portion of radius of curvature which continuously decreases toward the corresponding end of said rolling surface generator.

* * * * *